Sept. 19, 1944.  G. L. MOELLER  2,358,585
MOTOR STRUCTURE
Filed March 17, 1942
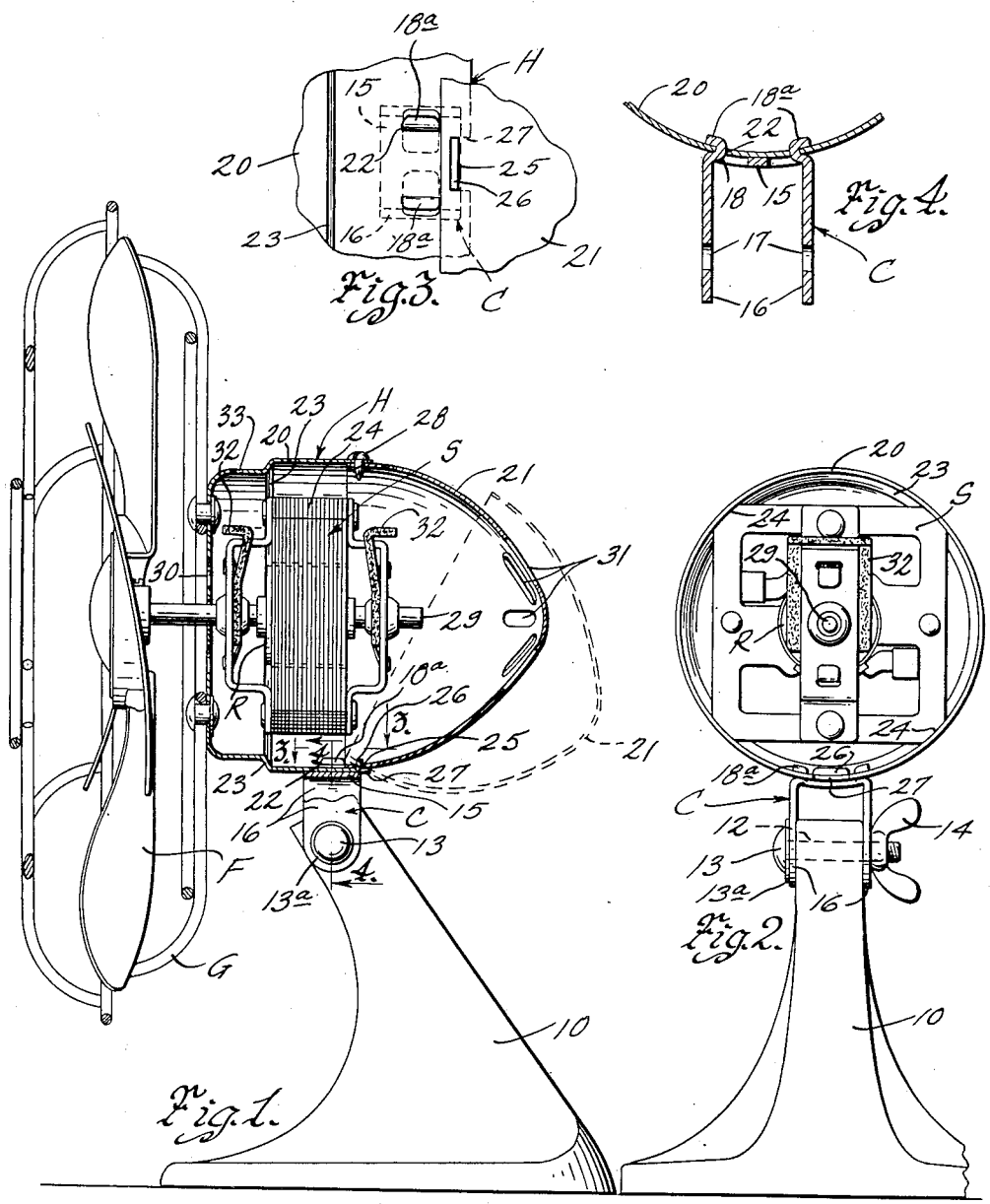
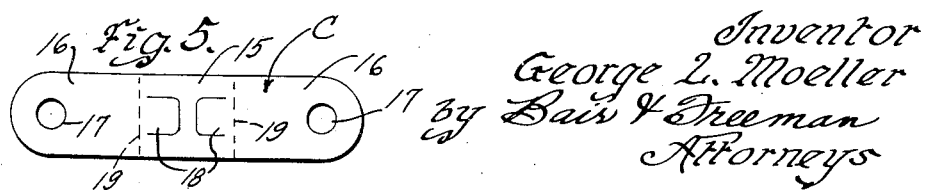
Inventor
George L. Moeller
By Bair & Freeman
Attorneys Patented Sept. 19, 1944

2,358,585

UNITED STATES PATENT OFFICE 2,358,585

MOTOR STRUCTURE

George L. Moeller, St. Louis, Mo., assignor to Knapp-Monarch Company, St. Louis, Mo., a corporation of Missouri Application March 17, 1942, Serial No. 435,029

8 Claims. (Cl. 172—36)

My present invention relates to a motor structure, and particularly to the support of its housing pivotally on a base and the support of the motor within the housing.

One object of the invention is to provide an inexpensive housing arrangement which has a simple arrangement of coaction of the housing with the motor to support the motor within the housing.

More particularly, it is an object of my invention to provide a two-part motor housing wherein one part has a shoulder against which the motor is positioned and the other part telescopes into the first part and is secured against the motor to confine it between such shoulder and the other part of the housing when so mounted in position.

Another object is to provide a simple clip arrangement which is readily and quickly connected with the motor housing during assembly, and which serves in conjunction with a clamp bolt to pivotally mount the motor housing with relation to a supporting base.

With these and other objects in view, my invention consists in the construction, arrangement and combination of the various parts of my device whereby the objects contemplated are attained, as hereinafter more fully set forth, pointed out in the claims and illustrated in the accompanying drawing in which:

Figure 1 is a side elevation partly in section, showing a fan structure embodying my invention;

Figure 2 is a rear elevation thereof with the fan and its guard omitted, and with the rear housing part removed;

Figure 3 is an enlarged sectional view on the line 3—3 of Figure 1;

Figure 4 is an enlarged vertical sectional view on the line 4—4 of Figure 1; and Figure 5 is a layout view of a supporting clip of my fan construction.

On the accompanying drawing I have used the reference numeral 10 to indicate a base. The base 10 is perforated in its upper end, as indicated at 12, and a U-shaped clip C coacts with the upper end, the connection between the two being by means of a clamp bolt 13 and its wing nut 14.

The clip C is made of a strap of heavy sheet metal or the like, with a cross-piece 15 and a pair of arms 16, the arms being perforated as at 17, for the bolt 13. The clip C is initially formed of flat material in the shape shown in Figure 5, with ears 18 sheared therefrom and the clip then formed U-shape by bending along the lines 19.

Supported on the clip C is a housing H comprising a front housing element 20 and a rear housing element 21. The housing elements 20 and 21 are cup-shaped and adapted to telescope together at their open ends, as will hereinafter appear. The housing element 20 has a pair of slots 22 therein, adapted to receive the ears 18 which are struck up from the cross-piece 15 of the clip C. These ears are then bent over, as indicated at 18a in Figure 4, and the housing element 20 is thereby rigidly supported on the clip C.

The housing elements 20 and 21 are formed of sheet metal, and during the forming process the housing 20 has a shoulder 23 formed therein. A fan motor, including a stator S and a rotor R, is positioned in the housing element 20 against the shoulder 23. By referring to Figure 2 it will be noted that the stator S is square in outline, with its corners, as indicated at 24, beveled so as to fit snugly within the housing element 20.

The back housing element 21 has a perforation 25 adapted to receive a tongue 26 bent up from the lower edge of the housing element 20. The edge of the housing element is notched as at 27 to form the tongue 26. The housing element 21 may be associated with the tongue 26 by positioning the housing element, as shown by dotted lines in Figure 1, and then swinging it upwardly and forwardly until it assumes the full-line position. Thereupon, a retaining screw 28 may be inserted through the telescoping edges of the housing elements 20 and 21 to retain the housing assembled. The forward edge of the housing element 21 contacts with the stator S to confine it between such edge and the shoulder 23, the motor being thereby supported within the housing H.

The motor S—R may be used for any desirable purpose, the structure being particularly designed for fans and the like. Accordingly, a fan F is shown on the shaft 29 of the motor, and is enclosed by a suitable guard G, in the usual manner. Obviously, the motor housing and its supporting clip C may be used in connection with a motor for other types of installations.

For cooling the motor S—R the front housing element 20 may be provided with air entrance openings 30, and the rear housing element 21 may be provided with air exit openings 31. The motor shown has a pair of felt wicks 32 for oiling the bearings thereof, and the housing elements 20 and 21 may be provided with openings 33 for the spout of an oil can for applying oil to the wicks.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. In a structure of the kind described, a motor housing comprising a pair of cup-shaped elements, one of said elements having a shoulder formed therein, a motor received in the open end of said element against said shoulder, the other of said elements telescoping into the open end of said first element, said elements having a tongue and slot connection at one side thereof and a removable screw through the opposite side thereof to retain said other element in said first element and to confine said motor in said housing between said shoulder and the inner edge of said other element.

2. In a motor structure, a motor housing comprising a pair of housing elements, one having a shoulder therein, a motor received in said housing element against said shoulder, the other of said housing elements being telescopically associated with said first housing element, said housing elements having a tongue and slot connection at one side thereof and a removable screw through the opposite side thereof to retain said elements telescoped together with said motor confined in said housing elements between said shoulder and the inner edge of said other housing element.

3. In a motor structure, a motor housing comprising a pair of cup-shaped housing elements, one of said housing elements having a shoulder, means for pivotally supporting said housing element on a supporting base comprising an inverted U-shaped clip having a pair of ears struck up from its cross-piece, said housing element having a pair of slots to receive said ears, said ears being bent within said housing element to rigidly support said element relative to said U-shaped clip, the supporting base having a perforated upper end, the arms of said U-shaped clip straddling said supporting base and being perforated, a clamp bolt through the perforations of said arms and base, a motor received in the open end of said housing element against said shoulder, the other of said housing elements telescoping into the open end of said first housing element, and means for securing said other housing element in position against said motor to confine the motor in said housing between said shoulder and the inner edge of said other housing element.

4. In a motor structure, a motor housing comprising a pair of cup-shaped housing elements of sheet metal, one of said housing elements having a shoulder formed therein, means for supporting said housing element on a supporting base comprising an inverted U-shaped clip having a pair of ears struck up therefrom, said housing element having a pair of slots to receive said ears, said ears being bent within said housing element to rigidly support said element relative to said U-shaped clip, a motor received in the open end of said housing element against said shoulder, the other of said housing elements telescoping into the open end of said first housing element, and means for securing said other housing element in position against said motor to confine the motor in said housing between said shoulder and the inner edge of said other housing element.

5. In a motor structure, a housing, a motor enclosed therein, and means for supporting said housing on a supporting base comprising an inverted U-shaped clip having a pair of ears struck up from its cross-piece, said housing having a pair of slots to receive said ears, said ears being bent within said housing to rigidly support said housing relative to said U-shaped clip, the supporting base having a perforated upper end, the arms of said U-shaped clip straddling said supporting base and being perforated and a clamp bolt through the perforations of said arms and base.

6. In a device of the class described, a motor housing, means for pivotally supporting said housing on a supporting base comprising an inverted U-shaped clip having ears struck up from its cross-piece, said housing having slots to receive said ears, said ears being bent within said housing to rigidly support it on said clip, the supporting base having a perforated upper end, the arms of said clip straddling said supporting base and being perforated, and a clamp bolt through the perforations of said arms and base.

7. In a fan structure, a motor housing comprising a pair of cup-shaped housing elements of sheet metal, one of said housing elements having a shoulder formed therein, means for pivotally supporting said housing element on a supporting base comprising an inverted U-shaped clip of sheet metal having ears struck up from its cross-piece, said housing element having slots to receive said ears, said ears being bent within said housing element to rigidly retain the element relative to the clip, the supporting base having a perforated upper end, the arms of said U-shaped clip straddling said supporting base and being perforated, a clamp bolt through the perforations of said arms and base, a motor in said housing element against said shoulder thereof, the other of said housing elements being telescopically associated with the first housing element, and means for retaining said housing elements assembled relative to each other and said motor confined between said shoulder and other housing element.

8. In a motor structure, a housing, a motor enclosed therein and means for supporting said housing on a supporting base comprising a U-shaped clip having a pair of ears struck up from the cross piece thereof, said housing having a pair of slots to receive said ears, said ears being bent within said housing to rigidly retain said housing supported on the cross piece of said clip, and means for mounting the arms of said clip on said supporting base.

GEORGE L. MOELLER.